(12) United States Patent
Dong et al.

(10) Patent No.: US 8,282,147 B2
(45) Date of Patent: Oct. 9, 2012

(54) FOAM LAMINATE PRODUCT AND PROCESS FOR PRODUCTION THEREOF

(75) Inventors: Kevin Liping Dong, Woodbridge (CA); Lisa Pileggi, Newmarket (CA); Inna Dolgopolsky, Maple (CA)

(73) Assignee: Proprietect L.P. (CA)

( * ) Notice: Subject to any disclaimer, the term of this patent is extended or adjusted under 35 U.S.C. 154(b) by 531 days.

(21) Appl. No.: 12/466,725

(22) Filed: May 15, 2009

(65) Prior Publication Data

US 2009/0284048 A1    Nov. 19, 2009

Related U.S. Application Data

(60) Provisional application No. 61/071,779, filed on May 16, 2008.

(51) Int. Cl.
*B60R 13/02* (2006.01)
(52) U.S. Cl. .................... 296/39.3; 296/214; 442/374
(58) Field of Classification Search ............... 296/39.3, 296/1.08, 214; 442/374
See application file for complete search history.

(56) References Cited

U.S. PATENT DOCUMENTS

| | | | | |
|---|---|---|---|---|
| 5,258,585 | A * | 11/1993 | Juriga | 181/286 |
| 5,536,556 | A * | 7/1996 | Juriga | 428/138 |
| 5,665,185 | A * | 9/1997 | Meeker | 156/62.2 |
| 5,976,295 | A * | 11/1999 | Ang | 156/219 |
| 5,976,646 | A * | 11/1999 | Stevens et al. | 428/31 |
| 2002/0084554 | A1* | 7/2002 | Nellis | 264/322 |
| 2002/0195844 | A1* | 12/2002 | Hipwell | 296/214 |
| 2004/0061358 | A1* | 4/2004 | Vishey et al. | 296/214 |
| 2004/0224595 | A1* | 11/2004 | Behnke et al. | 442/374 |
| 2004/0226648 | A1* | 11/2004 | Gupte et al. | 156/214 |
| 2004/0234744 | A1* | 11/2004 | Byma et al. | 428/304.4 |
| 2004/0235376 | A1* | 11/2004 | Byma et al. | 442/38 |
| 2004/0235378 | A1* | 11/2004 | Byma et al. | 442/43 |
| 2005/0241757 | A1* | 11/2005 | Gomez et al. | 156/307.3 |
| 2005/0258668 | A1* | 11/2005 | Brown | 296/214 |
| 2005/0263345 | A1* | 12/2005 | Erickson et al. | 181/290 |
| 2006/0121813 | A1* | 6/2006 | Kobayashi et al. | 442/415 |
| 2006/0141884 | A1* | 6/2006 | Haque | 442/361 |
| 2006/0255626 | A1* | 11/2006 | Asbury | 296/214 |
| 2007/0187032 | A1* | 8/2007 | Wang | 156/327 |
| 2008/0251187 | A1* | 10/2008 | Haque et al. | 156/148 |
| 2009/0174227 | A1* | 7/2009 | Ariznavarreta Esteban et al. | 296/214 |
| 2010/0112881 | A1* | 5/2010 | Bahukudumbi | 442/1 |
| 2010/0201034 | A1* | 8/2010 | Spengler | 264/323 |
| 2011/0049939 | A1* | 3/2011 | Ryu et al. | 296/214 |
| 2011/0285178 | A1* | 11/2011 | Li et al. | 296/214 |

* cited by examiner

*Primary Examiner* — Jason S Morrow

(74) *Attorney, Agent, or Firm* — Katten Muchin Rosenman LLP

(57) ABSTRACT

A laminate product particularly useful in vehicular applications is described. The laminate product comprises a foam core having a first major surface and a second major surface. One or both of the major surfaces comprises a fibrous layer and an adhesive layer adhering the fibrous layer to the foam core. The process for producing the laminate product involves exposing an initial laminate product to infrared radiation. A portion of the adhesive layer between fibers in fibrous layer being ablated. The foam laminate product has improved sound absorption properties and while maintaining desirable strength and stiffness properties. In addition, in certain cases, the peel strength of the fibrous reinforcing layer to the foam core is significantly improved in the present foam laminate product compared to the conventional approaches.

19 Claims, 1 Drawing Sheet

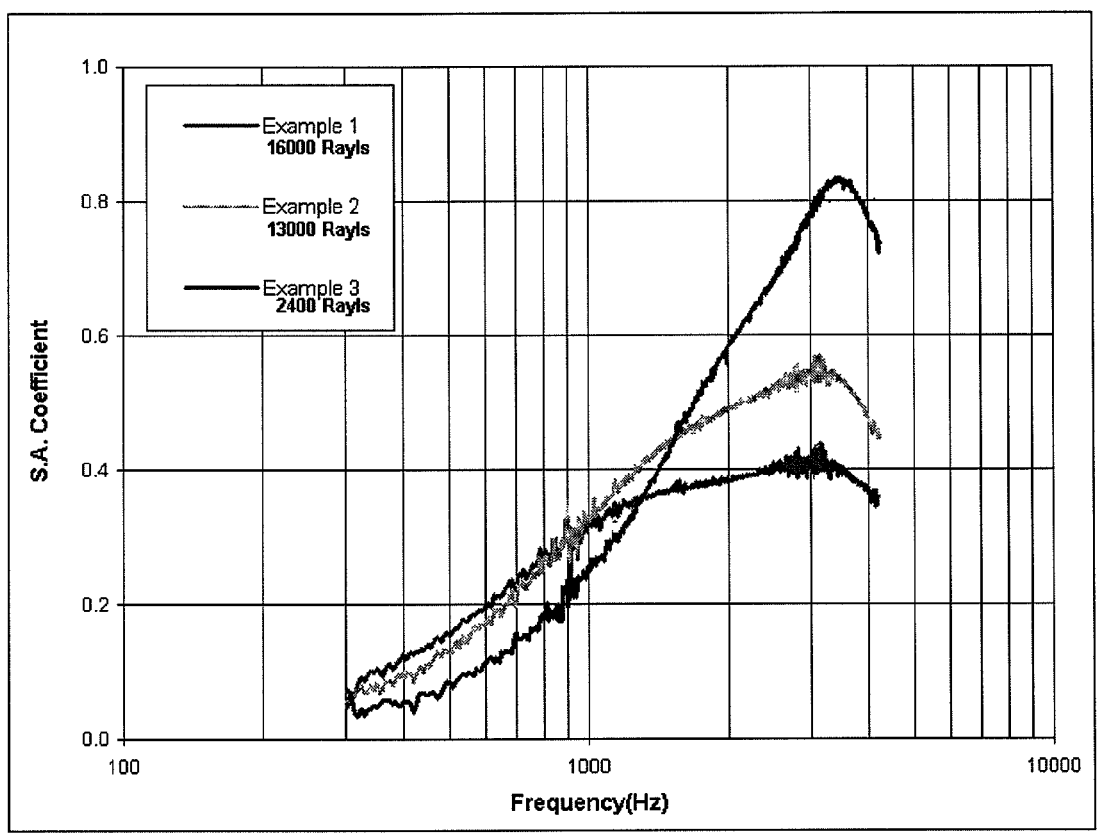

FOAM LAMINATE PRODUCT AND PROCESS FOR PRODUCTION THEREOF

CROSS-REFERENCE TO RELATED APPLICATION

The present application claims the benefit under 35 U.S.C. §119(e) of provisional patent application Ser. No. 61/071,779, filed May 16, 2008, the contents of which are hereby incorporated by reference.

BACKGROUND OF THE INVENTION

1. Field of the Invention

In one of aspects the present invention relates to a foam laminate product, more particularly such a product adapted for use in the interior of a vehicle. In another of its aspects, the present invention relates to process for the production of a foam laminate product. In a highly preferred embodiment, the present invention relates to a headliner, more particularly a vehicular headliner. In this preferred embodiment, an aspect of present invention relates to process for the production of a headliner.

2. Description of the Prior Art

Energy absorbing devices (also known as energy management devices) and structural devices are known. Such devices can take one of a variety of shapes and forms. Currently, one of the major applications for energy absorbing devices and/or structural devices is in vehicles, particularly automobiles. Such devices, when used in vehicles, would be of great convenience if they could be included in or substituted for trim panel and, indeed, are commonly referred to as trim panels.

In recent years, one particularly useful application of such energy absorbing devices and/or structural devices which has developed is in vehicular headliners. Vehicular headliners are generally known in the art. More particularly, automotive headliners are generally known in the art. In many case an automotive headliner will serve as a structural device and a device which combines both structural and energy absorbing properties.

As is known such automotive headliners are used to line the roof of the automobile. Conventionally, an automotive headliner is a laminate structure comprising, for example, a foam or other padded element having a cover material secured thereto. The cover material comprises a finished outer surface that faces the interior of the automobile and this the cover material is disposed adjacent or is comprised in the so-called A-surface of the headliner. The surface of the headliner adjacent the A-surface is the so-called B-surface. The B-surface of the headliner may or may not comprise a cover material.

Conventionally, foamed automotive headliners have made produced from isocyanate-based foams such as polyurethane foams.

When producing automotive headliners from polyurethane foams, it is conventional to utilize the so-called free-rise or slab polyurethane foams.

In a typical slab polyurethane foam production plant, the resultant foam is usually produced by dispensing a foamable composition into a trough having an open top (also known as a tunnel) and a conveyor bottom to move the composition away from the mixhead as the foam rises. Low pressure mixing is typically used and involves metering the components for foam production into a mixhead equipped with a stirrer (or other suitable agitation means) at a pressure generally less than 500 psi (usually 200-350 psi). The components are mixed in the mixhead and the foamable composition is expanded to produce polyurethane foam. As is known in the art, low pressure mixing is conventionally used to produce slabstock foam. It is known to vary the properties of the resulting foam by varying the nature and/or amount of one or more of the metered components.

Commercial slabstock polyurethane foam plants produce foam "buns" having dimensions such as 4 feet (height)×6 feet (width)×100 feet (length). Each bun is then cut into a plurality shorter length (e.g., 5 feet) buns, depending on the specifications of the particular automotive headliner being produced. The shorter length bun is then sliced into sheets of appropriate thickness (e.g., ⅛ to ½ inches). Each sheet is then covered, trimmed and secured in the automobile. It is also known in the art to subject each sheet to further processing steps such as thermoforming so to confer to the planar sheet a slightly contoured appearance which more closely assumes the shape of the roof of the automobile.

Thus, slabstock polyurethane foam conventionally used in the production of automotive headliners is known as a foam (e.g., a resilient foam) having at least one uncontoured surface (i.e., the foam is a "free-rise" foam).

U.S. Pat. Nos. 5,683,796 and 5,721,038 [both to Kornylo et al. (Kornylo)] teach a vehicular headliner made from molded polyurethane foam. The headliner taught by Kornylo purportedly comprises a substantially constant density while having central sections with a greater cross-sectional thickness than peripheral portions. The central sections must be relatively thick such that the headliner possesses acceptable sound absorbing properties while the peripheral portions must be relatively thin so as to facilitate securing of the headliner to the roof of the automobile.

International Publication Number WO 02/42119 [Zolfaghari] teaches an improvement to the headliner taught by Kornylo. Specifically, Zolfaghari teaches a vehicular headliner comprising energy management capabilities to improve vehicle occupant safety.

Regardless of the precise mode of production, it is conventional to reinforce the headliner using fibreglass, typically fibreglass mat or chopped fibreglass.

For example, if the headliner is produced from slabstock foam, it is conventional to initially form a blank comprising a foam core, an adhesive layer on one or both sides of the foam core and fibreglass mat layer or chopped fibreglass on each adhesive layer (the blank may also comprise other layers such as a trim cover and the like). The blank is then subjected to a forming operation which serves to shape the foam core and adhere the fibreglass mat layer or chopped fibreglass to each surface of the shaped foam core. Conventional forming operations include thermoforming and thermocrushing (also known as "Cold Forming"). For more detail on the production of vehicular headliners, see, for example, "Polyurethane Foam as an Integral "Core" Component of Automotive Headliner", Dolgopolsky et al., *Polyurethanes Expo '99* (1999).

Foam laminate products produced in this manner typically do not have very good sound absorption properties. Sound absorption is desirable particularly in vehicular applications of the foam laminate (e.g., a headliner). In order to deal with this problem, it has been conventional in the prior art to subject the foam laminate product to a post-production perforation step in which the surface or surfaces of the laminate product containing adhered fibreglass is pierced. In order to achieve desirable levels of sound absorption, it is necessary to effect relatively deep penetration during the preparation step which compromises the strength and stiffness properties of the laminate. This is particularly undesirable in headliner applications in the foam laminate since, in recent years, the automotive industry has been desirous of headliner components which possess energy management properties.

Thus, despite the advances made in the art, it would be highly desirable to have a method for producing a foam laminate material which result in a product having improved sound absorption properties. It would also be highly desirable if that product maintained the strength and stiffness properties currently seen for such products. It would also be highly desirable if such a product was also characterized by an improvement in peel strength of the fibreglass layer to the foam core.

SUMMARY OF THE INVENTION

It is an object of the present invention to obviate or mitigate at least one of the above-mentioned disadvantages of the prior art.

Accordingly, in one of its aspects, the present invention provides a laminate product comprising a foam core having a first major surface and a second major surface, the first major surface comprising a fibrous layer and an adhesive layer adhering the fibrous layer to the foam core, a portion of the adhesive layer between fibres in fibrous layer being ablated.

In another of its aspects, the present invention provides a process for producing the subject laminate product, the process comprising the steps of:

providing an initial laminate product comprising a foam core having a first major surface and a second major surface, the first major surface comprising a first fibrous layer and a first adhesive layer adhering the first fibrous layer to the foam core; and exposing the first major surface to infrared radiation.

Thus, the present inventors have surprisingly and unexpectedly discovered a novel foam laminate product having a very desirable combination properties. More particularly, the present foam laminate product has improved sound absorption properties similar to the sound absorption properties that can be obtained using the conventional preparation technique discussed above. However, the present foam laminate product has the additional advantage that the sound absorption properties can be conferred while maintaining desirable strength and stiffness properties. In addition, in certain cases, the peel strength of the fibrous reinforcing layer to the foam core is significantly improved in the present foam laminate product compared to the conventional approaches. All of these advantages make the present foam laminate product particularly suited for applications where a combination of sound absorption, mechanical properties (e.g., strength and stiffness) and peel strength are desired.

These advantageous properties are conferred to the present foam laminate product by exposing an initial laminate product consisting of a foam core and a fibrous layer adhered to the foam core by an adhesive layer to infrared radiation. While not wishing to be bound by any particular theory or mode of action, it is believed that the exposure to infrared radiation serves to melt or ablate a portion of the adhesive layer existing in the initial laminate product between fibers in the fibrous layer to achieve a phenomenon similar to a surface porosity on the surface being exposed. As the surface is exposed to infrared radiation, it is believed that a portion of the adhesive layer melts into the open cells of the foam core material thereby producing a relatively non-continuous layer at the outermost surface being exposed. The non-continuous layer is believed to result in the improved sound absorption properties while the melting action from exposure to radiation is believed to allow the resulting foam laminate product to maintain the strength and stiffness properties (unlike the prior art approach of using perforation).

While a preferred embodiment of the present invention is directed to application in vehicular foam parts, such as vehicular headliners, it will be appreciated by those of skill in the art that scope of the invention is not restricted to such applications. Thus, it may be possible to use the invention in other applications such as floorboards, cargo vehicle mats, Tonneau covers, and other applications where it is desirable to have a relatively lightweight article that has improved sound absorption properties.

BRIEF DESCRIPTION OF THE DRAWING

Embodiments of the present invention will be described with reference to the accompanying drawing, in which FIG. 1 illustrates sound absorption properties for various foam laminate materials discussed in the Examples below.

DETAILED DESCRIPTION OF THE PREFERRED EMBODIMENTS

The preferred foam for use in the core portion of the present laminate product is a foamed isocyanate-based polymer. Preferably, the isocyanate-based polymer is selected from the group comprising polyurethane, polyurea, polyisocyanurate, urea-modified polyurethane, urethane-modified polyurea, urethane-modified polyisocyanurate and urea-modified polyisocyanurate. As is known in the art, the term "modified", when used in conjunction with a polyurethane, polyurea or polyisocyanurate means that up to 50% of the polymer backbone forming linkages have been substituted.

Typically, the foamed isocyanate-based polymer is produced from a reaction mixture which comprises an isocyanate and an active hydrogen-containing compound.

The isocyanate suitable for use in the reaction mixture is not particularly restricted and the choice thereof is within the purview of a person skilled in the art. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g., an alkylene or arylene group). Moreover, Q may be represented by the general formula:

$$Q^1-Z-Q^1$$

wherein $Q^1$ is an alkylene or arylene group and Z is chosen from the group comprising —O—, —O-$Q^1$-, —CO—, —S—, —S-$Q^1$-S— and —$SO_2$—. Examples of isocyanate compounds which fall within the scope of this definition include hexamethylene diisocyanate, 1,8-diisocyanato-p-methane, xylyl diisocyanate, $(OCNCH_2CH_2CH_2OCH_2O)_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4"-triisocyanate and isopropylbenzene-alpha-4-diisocyanate.

In another embodiment, Q may also represent a polyurethane radical having a valence of i. In this case $Q(NCO)_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. Since the process of the present invention may relate to the production of polyurea foams, it will be appreciated that in this embodiment, the prepolymer could be used to prepare a polyurethane modified polyurea.

In another embodiment, the isocyanate compound suitable for use in the process of the present invention may be selected from dimers and trimers of isocyanates and diisocyanates, and from polymeric diisocyanates having the general formula:

wherein both i and j are integers having a value of 2 or more, and Q' is a polyfunctional organic radical, and/or, as additional components in the reaction mixture, compounds having the general formula:

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides ($QSO_2NCO$), cyanic acid and thiocyanic acid.

See also for example, British patent number 1,453,258, for a discussion of suitable isocyanates.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof. A more preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate. Another more preferred isocyanate is selected from the group comprising 2,4'-diphenylmethane diisocyanate, 4,4'-diphenylmethane diisocyanate and mixtures thereof. The most preferred isocyanate is a mixture comprising from about 15 to about 25 percent by weight 2,4'-diphenylmethane diisocyanate and from about 75 to about 85 percent by weight 4,4'-diphenylmethane diisocyanate.

If the process is utilized to produce a polyurethane foam, the active hydrogen-containing compound is typically a polyol. The choice of polyol is not particularly restricted and is within the purview of a person skilled in the art. For example, the polyol may be a hydroxyl-terminated backbone of a member selected from the group comprising polyether, polyester, polycarbonate, polydiene and polycaprolactone. Preferably, the polyol is selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. More preferred polyols are selected from the group comprising adipic acid-ethylene glycol polyester, poly(butylene glycol), poly(propylene glycol) and hydroxyl-terminated polybutadiene—see, for example, British patent number 1,482,213, for a discussion of suitable polyols. Preferably, such a polyether polyol has a molecular weight in the range of from about 100 to about 10,000, more preferably from about 100 to about 4,000, most preferably from about 100 to about 3,500.

If the core portion is to comprise a polyurea foam, the active hydrogen-containing compound comprises compounds wherein hydrogen is bonded to nitrogen. Preferably such compounds are selected from the group comprising polyamines, polyamides, polyimines and polyolamines, more preferably polyamines. Non-limiting examples of such compounds include primary and secondary amine terminated polyethers. Preferably such polyethers have a molecular weight of greater than about 100 and a functionality of from 1 to 25. Such amine terminated polyethers are typically made from an appropriate initiator to which a lower alkylene oxide is added with the resulting hydroxyl terminated polyol being subsequently aminated. If two or more alkylene oxides are used, they may be present either as random mixtures or as blocks of one or the other polyether. For ease of amination, it is especially preferred that the hydroxyl groups of the polyol be essentially all secondary hydroxyl groups. Typically, the amination step replaces the majority but not all of the hydroxyl groups of the polyol.

The reaction mixture used to produce the foamed isocyanate-based polymer core portion typically will further comprise a blowing agent. As is known in the art, water can be used as an indirect or reactive blowing agent in the production of foamed isocyanate-based polymers. Specifically, water reacts with the isocyanate forming carbon dioxide which acts as the effective blowing agent in the final foamed polymer product. Alternatively, the carbon dioxide may be produced by other means such as unstable compounds which yield carbon dioxide (e.g., carbamates and the like). Optionally, direct organic blowing agents may be used in conjunction with water although the use of such blowing agents is generally being curtailed for environmental considerations. The preferred blowing agent for use in the production of the present foamed isocyanate-based polymer comprises water.

It is known in the art that the amount of water used as an indirect blowing agent in the preparation of a foamed isocyanate-based polymer is conventionally in the range of from about 0.5 to as high as about 40 or more parts by weight, preferably from about 1.0 to about 10 parts by weight, based on 100 parts by weight of the total active hydrogen-containing compound content in the reaction mixture. As is known in the art, the amount of water used in the production of a foamed isocyanate-based polymer typically is limited by the fixed properties expected in the foamed polymer and by the tolerance of the expanding foam towards self structure formation.

To produce the core portion made from a foamed isocyanate-based polymer, a catalyst is usually incorporated in the reaction mixture. The catalyst used in the reaction mixture is a compound capable of catalyzing the polymerization reaction. Such catalysts are known, and the choice and concentration thereof in the reaction mixture is within the purview of a person skilled in the art. See, for example, U.S. Pat. Nos. 4,296,213 and 4,518,778 for a discussion of suitable catalyst compounds. Non-limiting examples of suitable catalysts include tertiary amines and/or organometallic compounds.

Additionally, as is known in the art, when the objective is to produce an isocyanurate, a Lewis acid must be used as the catalyst, either alone or in conjunction with other catalysts. Of course it will be understood by those skilled in the art that a combination of two or more catalysts may be suitably used.

Preferably, the foam core portion of the present laminate product comprises an compression force deflection at 10% deflection in the range of from about 2 psi to about 200 psi when measured pursuant to ASTM 3574-D, more preferably in the range of from about 5 psi to about 100 psi when measured pursuant to ASTM 3574-D most preferably, in the range of from about 10 psi to about 80 psi when measured pursuant to ASTM 3574-D. Throughout this specification, when reference is made to ASTM 3574-D, the test sample has the following dimensions: 2 ft.×2 ft.×1 in. (last dimension is the thickness).

Non-limiting and preferred examples of suitable polyurethane foams for use in producing the present headliner are available from Woodbridge Foam Corporation under the tradename Stratas.

Generally, the polyurethane foam suitable for use in the present headliners and having desirable energy management and/or structural characteristics may be produced from the following general non-limiting formulation:

| Component | Amount |
| --- | --- |
| Polymer Polyol | 100-0 parts |
| Polyol | 0-100 parts |
| Crosslinker | 0-30 parts/100 parts total polyol |
| Catalyst | 0.05 to 3.5 parts/100 parts total polyol |
| Silicone Surfactants | 0-1.5 parts/100 parts total polyol |
| $H_2O$ | 0.5 to 25 parts/100 parts total polyol |
| Isocyanate | Adequate quantity for an index of from about 0.60 to 1.30 ratio of NCO equivalents to the equivalents of NCO reactive sites. |

Suitable crosslinkers, catalysts and silicone surfactants are described in U.S. Pat. Nos. 4,107,106 and 4,190,712.

The preferred polyurethane foam suitable for use in the present headliner may be produced from the following formulation:

| Component | Amount |
| --- | --- |
| Polymer Polyol | 20-100 parts |
| Polyol | 0-80 parts |
| Crosslinker | 5-15 parts/100 parts total polyol |
| Catalyst | 0.5-1.2 parts/100 parts total polyol |
| Silicone Surfactants | 0.3-1.1 parts/100 parts total polyol |
| $H_2O$ | 1.75-2.75 parts/100 parts total polyol |
| Isocyanate | Adequate quantity for an index of from about 0.8 to 1.1 ratio of NCO equivalents to the equivalents of NCO reactive sites. |

The foam core in the present laminate product may have a substantially uniform density—this is typically a characteristic of a molded foam (i.e., a foam produced by constraining the expanding mass on all surfaces as it is converted to the foam product). Alternatively, and preferably, the foam core has a variable density—this is typically a characteristic of a slab foam (i.e., a foam produced by a process in which at least one surface of the expanding mass is unconstrained so that the mass may "free rise" as it is converted to the foam product) after conventional forming operations such as thermoforming and thermocrushing (also known as "Cold Forming"). For more detail on the production of vehicular headliners, see, for example, "Polyurethane Foam as an Integral "Core" Component of Automotive Headliner", Dolgopolsky et al., *Polyurethanes Expo* '99 (1999).

Preferably, the foam core in the present laminate product has a density in the range of from about 0.5 to about 30 pounds per cubic foot, more preferably in the range of from about 1 to about 20 pounds per cubic foot, even more preferably in the range of from about 2 to about 15 pounds per cubic foot, most preferably in the range of from about 2 to about 8 pounds per cubic foot.

The present foam laminate product comprise at least one adhesive layer which serves to adhere the fibrous layer to the foam core. The at least one adhesive layer may disposed one or both major surfaces of the foam laminate product (depending on whether a fibrous layer is disposed one or both major surfaces of the foam laminate product).

Preferably, the adhesive layer comprises an organic polymer.

In one preferred embodiment, the adhesive layer comprises a thermoplastic polymer. In another preferred embodiment, the adhesive layer comprises an elastomeric material. In yet another preferred embodiment, the adhesive layer comprises a thermosetting material (e.g., epoxy, polyurethane, polyurea, phenolics, acrylates, arylates, silicones, polysulfides, polyesters or mixtures of two or more of these).

Non-limiting examples of useful polymer substrates may be selected from the group comprising polyolefins, polyesters, nylons, poly(vinyl choride), polyurethanes, polyacrylates, latex, styrene-butadiene polymers, nitrile-butadiene polymers, silicone polymers, mixtures thereof, copolymers thereof and interpenetrating networks thereof.

Preferably, the adhesive layer comprises a polyolefin. More preferably, the adhesive layer comprises polyethylene, polypropylene, butyl rubber and mixtures thereof. Most preferably, the adhesive layer comprises polyethylene, polypropylene and mixtures thereof.

It will be appreciated that the fibrous layer may be woven or non-woven. Further information on such materials may be found on the following websites: http://www.nonwovensgroup.com, http://www.johnrstarr.com and http://www.inda.org.

In one preferred embodiment of the present foam laminate product, the first fibrous layer is woven. In another preferred embodiment, the first fibrous layer is non-woven. The fibres present in the first fibrous layer and the second fibrous layer may be in the form of chopped fibres.

In one embodiment of the present foam laminate product, the first fibrous layer comprises synthetic fibres. In one embodiment of the present foam laminate product, the first fibrous layer comprises natural fibres. Most preferably, the first fibrous layer comprises fibreglass.

The preferred method for producing the present laminate product will now be discussed.

The process for producing the present laminate product utilizes an initial laminate product. The initial laminate product has a foam core as described above. The foam core has two major surfaces opposed to one another. One or both of these major surfaces comprises a fibrous layer adhered to the major surface with an adhesive layer, again, as described above.

The initial laminate product used as a starting material in the present process preferably contains a fibrous layer comprising fibres in an amount from about 4 to about 40, most preferably from about 4 to about 25, most preferably from about 6 to about 15, gram/$m^2$.

Such an initial laminate product can be produced using conventional techniques. For example, it is possible to produce the initial laminate product using a technique as is generally set out in U.S. Pat. No. 5,665,185 [Meeker]. The process as described in Meeker can be modified so is not necessarily resultant in an initial laminate product wherein the fibrous material is encapsulated substantially within the exposed surface region of the adhesion layer. Also, Meeker can be modified to use different fibrous material as described above. Further, Meeker can be modified to use a prepared fibrous mat material instead of using chopped fibrous material.

Alternatively, the initial laminate can be produced by placing a stack or blank similar in a conventional press or forming/shaping device such as a device capable of carry out forming operations such as thermoforming and thermocrushing (also known as "Cold Forming"). Preferably, the stack or blank comprises the following layers:

at least one adhesive layer (i.e., one or more);
fibrous layer (e.g., in the form of a fibrous mat or other continuous layer);
at least one adhesive layer (i.e., one or more);
foam core layer;
at least one adhesive layer;
fibrous layer (e.g., in the form of a fibrous mat or other continuous layer; optional); and
scrim layer (optional).

Of course, other optional layers (e.g., further adhesive layers) may be included. For more detail on the production of vehicular headliners, see, for example, "Polyurethane Foam as an Integral "Core" Component of Automotive Headliner", Dolgopolsky et al., *Polyurethanes Expo '99* (1999).

In one embodiment, the approach is to form a laminate of the above-mentioned layers in a press and thereafter, in a separate step, place the laminate in a shaping/forming device which will serve to transform the laminate to a pre-determined shape—i.e., in this embodiment lamination and shaping are effect in separate steps. In an alternate embodiment, the approach is to form a shaped laminate of the above-mentioned layers by placing the stack or blank of the above-mention layers in a shaping/forming device which serves to concurrently adhere the layers together and transform the so-formed laminate to a predetermined shape—i.e., in this embodiment lamination and shaping are effected in the same stem.

In either embodiment, the stack or blank is then subjected to a temperature of at least about 100° C. at a pressure and for period of time sufficient to cause adhesive layers to melt and permeate the respective fibrous layers. In most cases, this results in a substantially continuous layer of adhesive encapsulating the fibrous layer and adhering it to the foam core. Consequently, the foam core layer assumes the pre-determined shape (contoured or planar) of the initial laminate product.

Preferably, the heating step in the present process is conducted at a temperature of at least about 120° C., more preferably in the range of from about 100° C. to about 250° C., even more preferably from about 120° C. to about 250° C., most preferably from about 150° C. to about 220° C.

The present process involves exposing the major surface or major surfaces of the initial laminate product to infrared radiation. If only one major surface includes a fibrous layer and an adhesive layer, the present process involves exposing that layer to infrared radiation. Of course, if both major surfaces of the initial laminate product comprise a fibrous layer and an adhesive layer, both of these surfaces will be exposed to infrared radiation.

The infrared radiation exposure step is typically conducted for a period of time sufficient to ablate a portion of the adhesive layer between fibres in the fibrous layer. Preferably, the exposure step is conducted for a duration sufficient to ablate a portion of the adhesive layer between fibres in the fibrous layer constituting to about 5% to about 80%, preferably from about 5% to about 60%, more preferably from about 10% to about 50%, most preferably from about 15% to about 50%, of the surface area of the major surface containing the fibrous layer and the adhesive layer.

Practically, this usually entails exposing the major surface of the initial laminate product containing the fibrous layer and the adhesive layer to infrared radiation for a period of from about 2 to about 90 seconds, more preferably from about 2 to about 75 seconds, most preferably from about 2 to about 60 seconds.

The resulting foam laminate product has the advantages described above. More particularly, the present laminate product has a very desirable combination of good sound absorption properties and a relatively low resistance to air flow (compared to laminate products that are subjected to a conventional perforation step or to no post-production step to improve acoustical properties).

Practically, the resulting foam laminate product has a resistance to airflow as measured pursuant to ASTM C522-97 of less then about 7000 Rayls, more preferably in a range from about 500 to about 6000 Rayls, more preferably in the range from about 500 to about 4000 Rayls, more preferably in the range of from about 500 to about 2000 Rayls.

Preferably, the infrared radiation used in the present process has a weight length and a range from about 0.7 µm to about 14 µm, more preferably from about 1.4 µm to about 14 µm, most preferably from about 1.4 µm to about 3.0 µm.

The infrared radiation step may be conducted using available equipment. For example, the infrared radiation step may be conducted using an infrared emitter commercially available from Heraeus Noblelight.

EXAMPLES 1-3

In the Examples, the following materials were used
Core foam (thickness=8 mm)—Polyurethane foam have a density of 40 kg/m$^3$ pounds per cubic foot commercially available from Woodbridge Foam Corporation under the tradename StrataLiner 1825;

Adhesive layer—High density polyethylene film commercially available from the Dow Chemical Company; and Fibrous layer—chopped fibreglass rovings—Commerially available from Vetrotex Saint-Gobain under the tradename Vetrotex 221 113 SMC.

Various samples of an initial foam laminate material were produced as follows. A blank or stack of the following layers was prepared:

adhesive layer;
fibrous layer;
core foam;
fibrous layer; and
scrim layer.

Each blank or stack was manually passed through a Meyer Laminator, consisting of an adjacent heating zone and cooling zone. The process parameters for lamination were as follows:

conveyor speed: 6 m/min-7 m/min;
hot Platens temp.: 180° C.-200° C.;
pressure roller offset: 1.0 mm v 1.5 mm; and
cold platens temperature: 20° C.

The resulting samples were conditioned for 24 hours.

One sample of the initial foam laminate material was designated as Example 1.

A second sample of the initial foam laminate was subjected to a perforation procedure as follows. The initial foam laminate from Example 1 was subjected to perforation using a heated roller. The perforations were made to a depth of approximately 1 mm. This sample was designated as Example 2.

A third sample of the initial foam laminate material was exposed to infrared radiation (wavelength approximately 1.4-2.4 μm) for a duration of 3 seconds using an infrared emitter commercially available from Heraeus Noblelight.

Thereafter, the strength of each sample was determined in accordance with ASTM D-5034 (utilizing a three-point loading system). The conditions used during the testing were:
 specimen dimensions: 76.2×192 mm;
 cross head rate: 50 mm/min;
 support points and loading nose had cylindrical shape and diameter of 19 mm; and
 distance between support points (span): 150 mm.
The strength of the laminated board is defined as Maximum load value (N) measured at failure of the sample.

The sound absorption and resistance to air flow results are presented in FIG. 1. As shown, laminate product according to the present invention (Example 3) had dramatically increased sound absorption in the frequency range of 1500-4000 Hz and reduced resistance to air flow compared to the initial foam laminate product (Example 1) and the laminate product subject to perforation (Example 2).

The strength and stiffness properties of the various samples is reported in Table 1.

TABLE 1

|  | Maximum Load (N) | | Stiffness (N/mm) | |
| --- | --- | --- | --- | --- |
|  | MD | CD | MD | CD |
| Example 1 | 35.5 | 35.1 | 15.1 | 12.9 |
| Example 2 | 31.7 | 31.8 | 12.0 | 11.7 |
| Change | −11% | −9% | −21% | −9% |
| Example 3 | 37.4 | 33.6 | 14.9 | 12.1 |
| Change | +5% | +4% | +1% | +6% |

As can be seen from the results in Table 1, laminate product according to the present invention (Example 3) had similar or improved strength a stiffness properties compared to those of the initial foam laminate product (Example 1). In contrast, the strength and stiffness properties of the initial foam laminate product subjected to perforation (Example 2) deteriorated compared to those of the initial foam laminate product (Example 1)

While this invention has been described with reference to various preferred embodiments and examples, the description is not intended to be construed in a limiting sense. Thus, various modifications of the illustrative embodiments, as well as other embodiments of the invention, will be apparent to persons skilled in the art upon reference to this description. For example, it is possible to include a finishing or trim cover on one major surface of the present laminate product thereby producing a finished part. Still further, it is possible to add other elements to the foam laminate product during production thereof. For example, it is possible to incorporate one or more of: (i) an electrically conduct layer in the foam laminate product to provide a heating function, (ii) an additional sound absorbing layer to further improve acoustical performance of the foam laminate product, and/or (iii) a flame retardant layer to improve flame retardant properties of the foam laminate. It is therefore contemplated that the appended claims will cover any such modifications or embodiments.

All publications, patents, patent applications and subject matter on Internet website referred to herein are incorporated by reference in their entirety to the same extent as if each individual publication, patent or patent application was specifically and individually indicated to be incorporated by reference in its entirety.

What is claimed is:

1. A laminate product comprising a foam core having a first major surface and a second major surface, the first major surface comprising a first fibrous layer and a first adhesive layer adhering the first fibrous layer to the foam core, a portion of the first adhesive layer being melted and ablated between fibres in first fibrous layer.

2. The laminate product defined in claim 1, wherein the portion of the first adhesive layer melted and ablated between fibres in the first fibrous layer comprises from about 5% to about 80% of the surface area of the first major surface.

3. The laminate product defined in claim 1, wherein the portion of the first adhesive layer melted and ablated between fibres in the first fibrous layer comprises from about 15% to about 50% of the surface area of the first major surface.

4. The laminate product defined in claim 1, wherein the second major surface comprises a second fibrous layer and a second adhesive layer adhering the second fibrous layer to the foam core, a portion of the second adhesive layer being melted and ablated between fibres in the second fibrous layer.

5. The laminate product defined in claim 4, wherein the portion of the second adhesive layer between fibres in the second fibrous layer being melted and ablated comprises from about 5% to about 80% of the surface area of the second major surface.

6. The laminate product defined in claim 4, wherein the portion of the second adhesive layer between fibres in the second fibrous layer being melted and ablated comprises from about 15% to about 50% of the surface area of the second major surface.

7. The laminate product defined in claim 1, wherein the first adhesive layer is selected from the group consisting of an organic polymer, a thermoplastic polymer, an elastomeric material and a thermosetting material.

8. The laminate product defined in claim 1, wherein the first adhesive layer is selected from the group consisting of polyolefins, polyesters, nylons, poly(vinyl choride), polyurethanes, polyacrylates, latex, styrene-butadiene polymers, nitrile-butadiene polymers, silicone polymers, mixtures thereof, copolymers thereof and interpenetrating networks thereof.

9. The laminate product defined in claim 1, wherein the first adhesive layer is selected from the group consisting of polyethylene, polypropylene, butyl rubber and mixtures thereof.

10. The laminate product defined in claim 1, wherein the first fibrous layer is selected from the group consisting of chopped fibres, synthetic fibres, natural fibres.

11. The laminate product defined in claim 1, wherein the first fibrous layer comprises fibreglass.

12. The laminate product defined in claim 1, wherein the first fibrous layer comprises fibres in an amount of from about 4 to about 40 grams/m$^2$.

13. The laminate product defined in claim 1, having a resistance to air flow as measured pursuant to ASTM C522-97 of less than about 7000 Rayls.

14. The laminate product defined in claim 1, having a resistance to air flow as measured pursuant to ASTM C522-97 in the range of from about 500 to about 2000 Rayls.

15. The laminate product defined in claim 1, wherein the foam core comprises an compression force deflection at 10% deflection in the range of from about 2 psi to about 200 psi when measured pursuant to ASTM 3574-D.

16. The laminate product defined in claim 1, wherein the foam core comprises a polyurethane foam.

17. The laminate product defined in claim 1, wherein the foam core comprises a thickness of greater than or equal to about 2 mm.

18. The laminate product defined in claim 1, wherein the foam core comprises a thickness in the range of from about 4 mm to about 12 mm.

19. A vehicular headliner comprising the laminate product defined in claim 1.

* * * * *